Jan. 17, 1950  F. A. KRÖGER ET AL  2,494,883
CASCADED FLUORESCENT MATERIAL
Filed Oct. 23, 1946
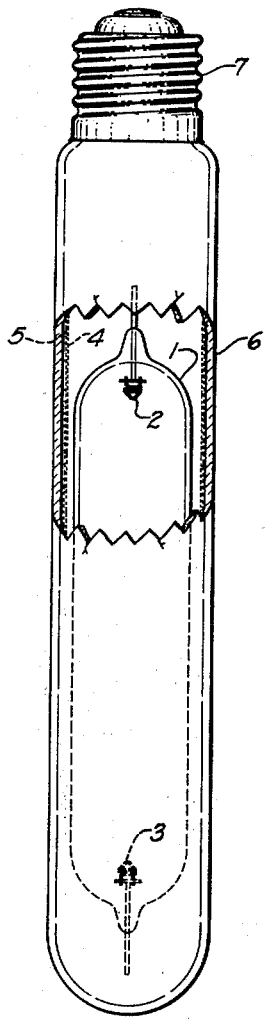
Inventors:
Ferdinand Anne Kröger,
Jacob Voogd,
by John H Anderson
His Attorney.

Patented Jan. 17, 1950

2,494,883

UNITED STATES PATENT OFFICE 2,494,883

CASCADED FLUORESCENT MATERIAL

Ferdinand Anne Kröger and Jacob Voogd, Eindhoven, Netherlands, assignors to General Electric Company, a corporation of New York Application October 23, 1946, Serial No. 705,227
In Belgium August 2, 1945

Section 1, Public Law 690, August 8, 1946
Patent expires August 2, 1965

7 Claims. (Cl. 176—122)

Our invention relates to electric discharge lamps and fluorescent materials or compositions and more particularly to high pressure mercury vapor discharge lamps employing fluorescent materials or compositions as luminescent screens for the conversion of part of the ultraviolet radiation into visible light.

As is well appreciated, high pressure mercury vapor discharge devices are relatively efficient in the production of visible light, but the radiation emitted contains little red light. It has been suggested previously that a discharge device may be combined with a luminescent screen, which may be positioned either inside or outside the envelope of the device. Such a luminescent screen contains substances which convert part of the invisible radiant energy such as ultraviolet radiation emitted by the mercury vapor discharge into light of such wavelength which in conjunction with the light of the discharge device there is produced a resulting spectrum which more closely approaches that of daylight. Consequently, in such screens use is made of substances which emit red light upon irradiation by ultraviolet.

It is an object of our invention to provide a new and improved fluorescent material or materials, which serve as a generator of visible red light.

It is another object of our invention to provide a new and improved luminescent screen for electric discharge devices.

It is a further object of our invention to provide a new improved high pressure mercury vapor lamp which is provided with a cascaded or multi-layer luminescent screen which is excited by ultraviolet radiation and which transforms part of the ultraviolet radiation into red light to complement the spectrum produced by the mercury vapor discharge thereby effecting a spectrum closely approaching that of daylight.

In accordance with the teachings of our invention we provide new and improved luminescent or fluorescent multistratum screen which serves as a generator of red light when exposed to ultraviolet radiation. Preferably the material comprises two layers of different phosphors each of which emits visible red light and which are individually and selectively responsive to definite regions of the spectrum. One of the phosphors is excited by and responsive to the shorter wave ultraviolet radiation and is pervious to the longer wave ultraviolet, while the second phosphor is selectively responsive to the longer wave ultraviolet within the ultraviolet range.

One of the layers comprises cadmium borate activated with manganese and is responsive to and excited by ultraviolet radiation having a wavelength shorter than 3250 Angstrom units. The other layer comprises magnesium titanate activated with manganese and is excitable by radiation within the long wave length ultraviolet and part of the visible range extending from 2700 to 5000 Angstrom units, having a peaked response at about 3400 Angstrom units.

While the use of these substances separately has the effect of improving the color produced by an electric discharge in mercury vapor, the present invention accomplishes a further improvement of the spectrum of the light emitted.

For a better understanding of our invention reference may be had to the following description taken in connection with the accompanying drawing and its scope will be pointed out in the appended claims. The single figure of the drawing represents our invention as applied to a high pressure mercury vapor discharge lamp.

Referring more particularly now to the drawing our invention is there illustrated as applied to an electric discharge device such as a high pressure mercury vapor lamp. It is to be understood that our invention is applicable to other types of discharge devices or lamps and that for the purposes of illustration we have chosen to represent it as applied to a lamp of the high pressure type employing an inner envelope 1 in which there are mounted electrodes 2 and 3 between which the electric discharge is established. These electrodes may be constructed of a refractory metal and may be activated by materials such as oxides of the alkaline earth metals. As shown the electrodes 2 and 3 may be of the thermionic type, that is, electrodes which are heated to emission temperatures by virtue of the arc discharge which extends between them during normal operation. Other forms of electrodes, such as filamentary thermionic cathodes, or unactivated electrodes may be employed if desired.

Within the envelope 1 there is employed a quantity of mercury which under operation of the lamp is partially or completely vaporized to support an arc discharge. In addition, a quantity of an inert gas, such as argon, may be used to facilitate initiation of the discharge. Preferably we employ a high pressure mercury vapor discharge type lamp, the size of the envelope, the operating temperature and voltage being such that during operation of the lamp the diameter of the discharge is constricted.

The luminescent screen or materials which we provide may be employed in a wide variety of ways. For example, the luminescent screen may be provided either inside or outside the envelope within which the discharge takes place. If as shown, the fluorescent or luminescent screen is used outside the envelope 1, this envelope must be constructed of a vitreous material, such as quartz, which is pervious to ultraviolet radiation.

We provide a luminescent screen comprising layers 4 and 5 preferably positioned on the interior surface of an outer envelope 6 which encloses the envelope 1, supporting structure and leads (not shown) connected to electrodes 2 and 3. Electrical connections to the arc-supporting electrodes are completed through contacts or buttons on the lamp base 7.

The innermost layer 4 comprises cadmium borate activated with manganese and which when excited by ultraviolet radiation of a wavelength less than 3250 Angstrom units converts this energy into visible red light. The second layer 5, as viewed from the position of the discharge path, comprises magnesium titanate activated with manganese and when subjected to radiation within the range of 2700 to 5000 Angstrom units is excited thereby to convert a part of this energy to visible red light. Magnesium titanate so activated is found to have a peaked response at about 3400 Angstrom units.

It will be observed that the cadmium borate and magnesium titanate are excited by different portions of the mercury spectrum. Moreover the magnesium titanate which is excited in part in the long wave ultraviolet region, absorbs the short wave ultraviolet radiation without becoming luminescent or fluorescent, which makes it desirable that this layer be positioned as the outermost layer of the screen.

Whereas by the use of these substances separately part of the available ultraviolet radiation is not converted into red light, the use of these two substances together when excited by the radiation from a high-pressure mercury vapor discharge device effects the transformation of a substantially larger part of the ultraviolet radiation into visible red radiation.

Our invention affords advantages over the prior art arrangements wherein a plurality of luminescent or fluorescent materials were employed. The prior art arrangements convert radiation into light of different colors while attempting to use the same range of the exciting radiation, whereas the substances which we employ are selectively responsive to different portions of the ultraviolet radiation, even though there is an overlapping region from 2700 to 3250 Angstrom units. The magnesium titanate, in addition, absorbs a portion of the violet radiation of the discharge within the region of 4350 Angstrom units.

In the event the luminescent or fluorescent substances comprising layers 4 and 5 are applied to the inside of the envelope 1 in which the discharge is present, the lamp characteristics should be established so that during operation the temperature of the luminescent screen does not exceed 100° C., since above this temperature the efficiency of the conversion of the ultraviolet radiation into visible light decreases.

What we claim as new and desire to secure by Letters Patent of the United States is:

1. In a generator of red light the combination of two layers of fluorescent materials one layer of which comprises cadmium borate activated with manganese excited by radiation having a wavelength less than 3250 Angstrom units and the other which comprises magnesium titanate activated with manganese and which is excited by radiation between 2700 to 5000 Angstrom units.

2. A cascaded phosphor comprising two layers of different fluorescent materials each of which transforms ultraviolet radiation into visible red light comprising cadmium borate activated with manganese and positioned near a source of ultraviolet radiation and magnesium titanate activated by manganese positioned on the side of said cadmium borate removed from said source.

3. A multi-layer phosphor comprising two layers of fluorescent materials each of which transforms ultraviolet radiation into visible red light, one of said layers comprising cadmium borate activated with manganese and the other layer comprising magnesium titanate activated with manganese and which is excitable by radiation lying within the range from 2700 Angstrom units to 5000 Angstrom units.

4. A generator of visible red light comprising two layers of different fluorescent materials each of which produces visible red light upon excitation by ultraviolet radiation, one of said materials comprising cadmium borate activated with manganese and which is excited by radiation having a wavelength less than 3250 Angstrom units, and the other material comprising magnesium titanate activated with manganese and which is excited by radiation lying within the range of 2700 to 5000 Angstrom units having a peaked response at approximately 3400 Angstrom units.

5. A multi-layer phosphor including one layer comprising cadmium borate activated with manganese and which is selectively responsive to ultraviolet radiation below 3250 Angstrom units and a second layer comprising magnesium titanate activated with manganese and which is selectively responsive to ultraviolet radiation above 2700 Angstrom units.

6. A cascaded fluorescent screen comprising layers of two different phosphors each of which converts ultraviolet radiation into visible red light, one of said phosphors being responsive to short wave ultraviolet radiation and pervious to the long wave ultraviolet, the other of said phosphors being responsive to only the longer wave ultraviolet radiation.

7. In an electric lamp, the combination of a high pressure mercury vapor discharge device which generates both short-wave and long-wave ultraviolet radiations in addition to visible radiations deficient in red light, and a fluorescent screen comprising two superimposed layers of different fluorescent materials exposed to the radiations generated by said discharge device and each of which transforms ultraviolet radiations into red light, the first layer as viewed from the position of the discharge comprising cadmium borate activated with manganese and excited by ultraviolet radiation having a wavelength shorter than 3250 Angstrom units and the second layer comprising magnesium titanate activated with manganese and excited by radiation lying within the range of 2700 to 5000 Angstrom units and having a peaked response at approximately 3400 Angstrom units.

FERDINAND ANNE KRÖGER.
JACOB VOOGD.

REFERENCES CITED

The following references are of record in the file of this patent:

UNITED STATES PATENTS

| Number | Name | Date |
|---|---|---|
| 2,096,986 | Von Ardenne | Oct. 26, 1937 |
| 2,181,305 | Myers | Nov. 28, 1939 |
| 2,243,828 | Leverenz | May 27, 1941 |
| 2,244,558 | Krautz | June 3, 1941 |
| 2,357,732 | Ehrlich | Sept. 5, 1944 |

FOREIGN PATENTS

| Number | Country | Date |
|---|---|---|
| 474,907 | Great Britain | Nov. 9, 1937 |